(12) United States Patent
Nam et al.

(10) Patent No.: US 11,874,168 B2
(45) Date of Patent: Jan. 16, 2024

(54) SPECTROMETER, AND APPARATUS AND METHOD FOR ESTIMATING BIO-INFORMATION

(71) Applicant: SAMSUNG ELECTRONICS CO., LTD., Suwon-si (KR)

(72) Inventors: Sung Hyun Nam, Yongin-si (KR); Woo Chang Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/723,815

(22) Filed: Apr. 19, 2022

(65) Prior Publication Data
US 2023/0194341 A1    Jun. 22, 2023

(30) Foreign Application Priority Data

Dec. 17, 2021   (KR) .......................... 10-2021-0181895

(51) Int. Cl.
*G01J 3/02*    (2006.01)
*G01J 3/18*    (2006.01)

(52) U.S. Cl.
CPC ........... *G01J 3/0275* (2013.01); *G01J 3/0202* (2013.01); *G01J 3/0229* (2013.01); *G01J 3/18* (2013.01)

(58) Field of Classification Search
CPC ...... G01J 3/0275; G01J 3/0202; G01J 3/0229; G01J 3/18; G01J 3/02; G01J 3/28; G01J 3/14

See application file for complete search history.

(56) References Cited

U.S. PATENT DOCUMENTS

| | | | | |
|---|---|---|---|---|
| RE28,216 E | * | 10/1974 | Barringer ................ | G01J 3/457 250/237 G |
| 3,869,212 A | | 3/1975 | Burcher et al. | |
| 4,060,326 A | * | 11/1977 | Tirabassi ................ | G01J 3/427 356/330 |
| 4,615,619 A | * | 10/1986 | Fateley ................ | G01J 3/2846 356/330 |
| 5,208,642 A | * | 5/1993 | Narutaki ................ | G01S 17/10 356/5.12 |

(Continued)

FOREIGN PATENT DOCUMENTS

DE         19813558 A1    10/1999
EP         0355174 A1    2/1990

(Continued)

OTHER PUBLICATIONS

Communication dated Nov. 28, 2022 by the European Patent Office in counterpart European Patent Application No. 22175101.9.

*Primary Examiner* — Abdullahi Nur
(74) *Attorney, Agent, or Firm* — Sughrue Mion, PLLC

(57) ABSTRACT

A spectrometer includes: a dispersive element configured to split light; a detector comprising a plurality of pixels configured to receive the split light; an optical mask disposed in an optical path of the light between the dispersive element and the detector and comprising a plurality of light transmitting portions and a plurality of light blocking portions which are arranged alternately; and a driver configured to control a position of the optical mask or a position of the detector, and change a light incident area of each of the plurality of pixels to receive the light incident on the plurality of light transmitting portions of the optical mask.

14 Claims, 11 Drawing Sheets

(56) References Cited

U.S. PATENT DOCUMENTS

| | | | |
|---|---|---|---|
| 5,815,261 A * | 9/1998 | Brooks | G01J 3/457 |
| | | | 356/310 |
| 5,912,727 A * | 6/1999 | Kawai | G03F 7/70058 |
| | | | 355/71 |
| 7,800,683 B2 | 9/2010 | Zalevsky et al. | |
| 9,420,241 B2 | 8/2016 | Mutters et al. | |
| 10,775,739 B2 | 9/2020 | Park et al. | |
| 2005/0061969 A1* | 3/2005 | Greywall | G01N 21/3504 |
| | | | 250/300 |
| 2010/0097604 A1* | 4/2010 | Duncan | G01J 3/021 |
| | | | 356/326 |
| 2014/0063332 A1* | 3/2014 | Miyawaki | H04N 23/60 |
| | | | 348/360 |

FOREIGN PATENT DOCUMENTS

| | | |
|---|---|---|
| GB | 2270230 A | 3/1994 |
| JP | 2007-515842 A | 6/2007 |
| KR | 10-1244601 B1 | 3/2013 |
| KR | 10-1721455 B1 | 4/2017 |
| KR | 10-1833623 B1 | 2/2018 |

* cited by examiner

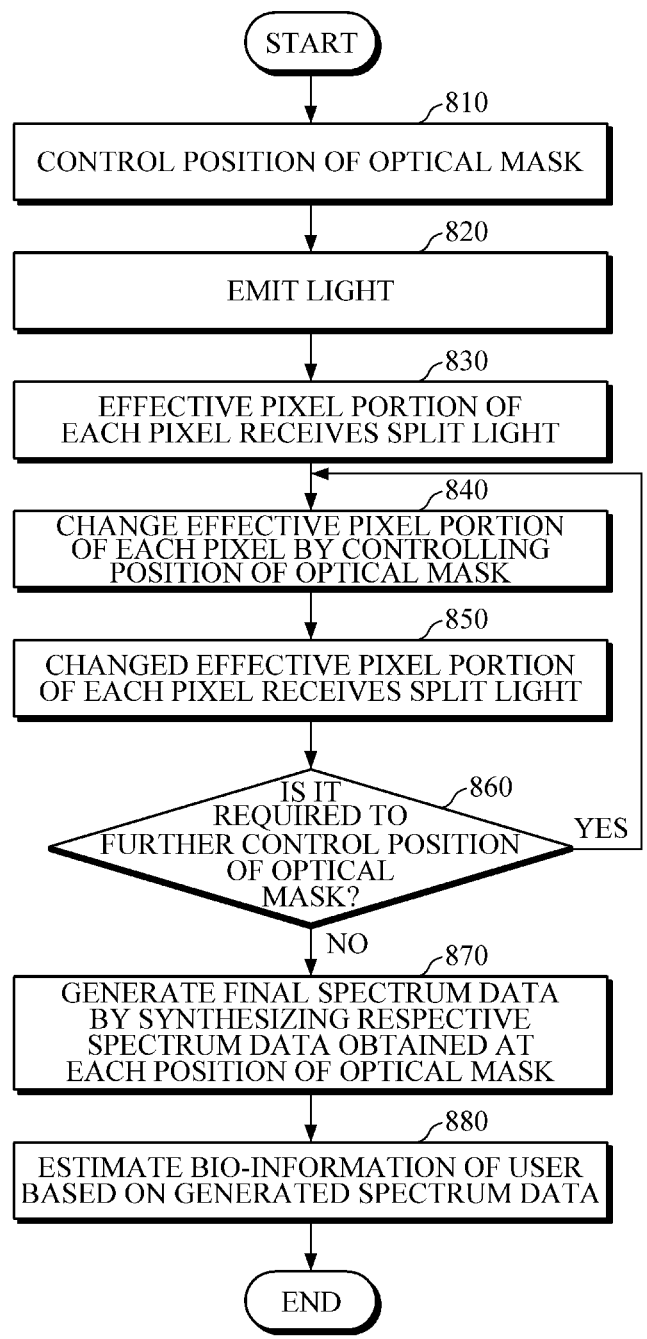

SPECTROMETER, AND APPARATUS AND METHOD FOR ESTIMATING BIO-INFORMATION

CROSS-REFERENCE TO RELATED APPLICATION(S)

This application claims priority from Korean Patent Application No. 10-2021-0181895, filed on Dec. 17, 2021 in the Korean Intellectual Property Office, the disclosure of which is incorporated herein by reference in its entirety.

BACKGROUND

1. Field

The following description relates to spectroscopic technology for measuring a spectrum emitted or absorbed by a material.

2. Description of the Related Art

A spectrometer is used for qualitative analysis, quantitative analysis, and state analysis of a material by measuring a spectrum emitted or absorbed by the material. By using the spectrometer, a bio-signal related to blood glucose, cholesterol, and the like may be measured non-invasively from a living body. When mounted in a wearable mobile device, the spectrometer may non-invasively measure various bio-signals for use in mobile healthcare fields. To this end, it may be required to manufacture the spectrometer in a compact size.

SUMMARY

According to an aspect of an example embodiment, there is provided a spectrometer including: a dispersive element configured to split light; a detector comprising a plurality of pixels configured to receive the split light; an optical mask disposed in an optical path of the light between the dispersive element and the detector and comprising a plurality of light transmitting portions and a plurality of light blocking portions which are arranged alternately; and a driver configured to control a position of the optical mask or a position of the detector, and change a light incident area of each of the plurality of pixels to receive the light incident on the plurality of light transmitting portions of the optical mask.

The dispersive element may be a diffraction grating or a linear variable filter.

The driver may include at least one of a voice coil, a magnet, and a Hall sensor.

The driver may be disposed on two opposing sides of the optical mask to change the position of the optical mask.

The driver may be configured to control the position of the optical mask, and the optical mask may be disposed between the dispersive element and the detector along the optical path of the light.

The plurality of light transmitting portions and the plurality of light blocking portions may include a plurality of pairs of a light transmitting portion and a light blocking portion. Each of the plurality of pairs of the light transmitting portion and the light blocking portion is arranged to correspond to each of the plurality of pixels of the detector in a one-to-one correspondence.

A ratio between a width of the light transmitting portion and a width of the light blocking portion may be a predetermined integer.

The driver may sequentially change the position of the optical mask based on the ratio between the width of the light transmitting portion and the width of the light blocking portion, to sequentially change the light incident area of each of the plurality of pixels of the detector.

The plurality of pixels of the detector may be arranged in a line array, or are formed as an area sensor.

The driver may be disposed on two opposing sides of the detector to change the position of the detector.

The driver may be configured to control the position of the detector, and the optical mask may be disposed between the dispersive element, and the detector and the driver.

The plurality of light transmitting portions and the plurality of light blocking portions may include a plurality of pairs of a light transmitting portion and a light blocking portion, and each of the plurality of pairs of the light transmitting portion and the light blocking portion may be arranged to correspond to each of the plurality of pixels of the detector in a one-to-one correspondence.

A ratio between a width of the light transmitting portion and a width of the light blocking portion may be a predetermined integer.

The driver sequentially may change the position of the detector based on the ratio between the width of the light transmitting portion and the width of the light blocking portion, to sequentially change the light incident area of each of the plurality of pixels of the detector.

According to an aspect of an example embodiment, there is provided an apparatus for estimating bio-information, the apparatus including: a light source configured to emit light; a dispersive element configured to split the light; a detector comprising a plurality of pixels configured to receive the split light; an optical mask disposed in an optical path of the light between the dispersive element and the detector, and comprising a plurality of light transmitting portions and a plurality of light blocking portions which are arranged alternately; a driver configured to control a position of the optical mask or a position of the detector, and change a light incident area of each of the plurality of pixels to receive the light incident on the plurality of light transmitting portions of the optical mask; and a processor configured to estimate bio-information of a user based on a light receiving result of the detector.

The processor may be further configured to generate spectrum data based on the light incident on the light incident area of each of the plurality of pixels by controlling the position the optical mask.

The plurality of light transmitting portions and the plurality of light blocking portions may include a plurality of pairs of a light transmitting portion and a light blocking portion, and each of the plurality of pairs of the light transmitting portion and the light blocking portion may be arranged to correspond to each of the plurality of pixels of the detector in a one-to-one correspondence.

A ratio between a width of the light transmitting portion and a width of the light blocking portion is a predetermined integer The driver may be configured to sequentially change the position of the optical mask based on the ratio between the width of the light transmitting portion and the width of the light blocking portion, to sequentially change the light incident area of each of the plurality of pixels of the detector.

According to an aspect of an example embodiment, there is provided an electronic device including: a light source configured to emit light, a dispersive element provided between the light source and the light detector, and configured to split the light into the light of multiple wavelengths;

a light detector including at least one pixel configured to detect the light emitted from the light source; an optical mask that is provided between the light source and the light detector along an optical path of the light, and that includes a light transmitting portion and a light blocking portion; and a driver configured to adjust a position of the optical mask so that a portion of the at least one pixel is aligned with the light transmitting portion of the optical mask, and another portion of the at least one pixel is aligned with the light blocking portion of the optical mask.

BRIEF DESCRIPTION OF THE DRAWINGS

The above and/or other aspects will be more apparent by describing certain example embodiments, with reference to the accompanying drawings, in which:

FIG. 8 is a flowchart illustrating a method of estimating bio-information according to an example embodiment of the present disclosure.

DETAILED DESCRIPTION

Figure 1:
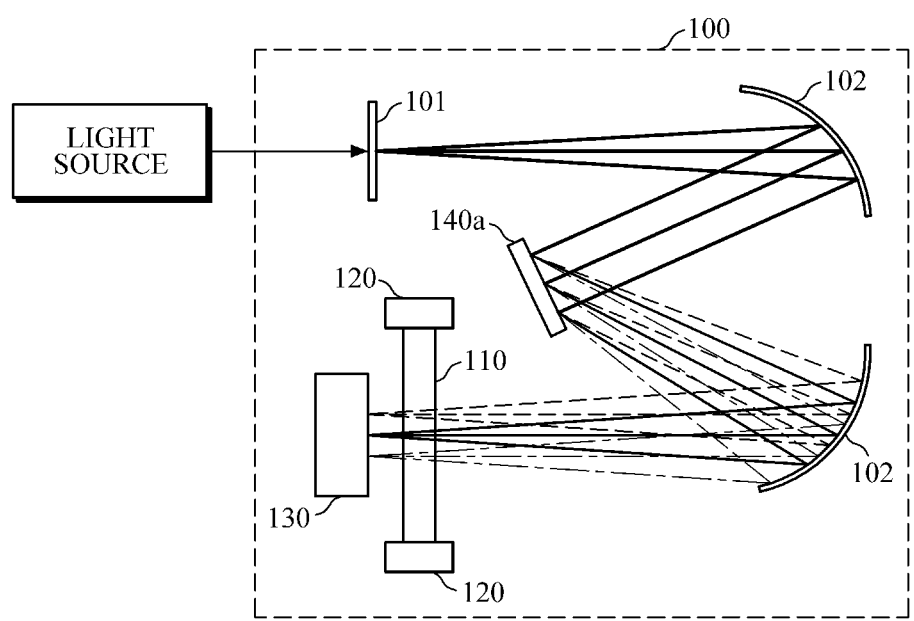
FIG. 1 is a block diagram illustrating a spectrometer according to an example embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit for performing at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a block diagram illustrating a spectrometer according to an example embodiment of the present disclosure. Referring to FIG. 1, a spectrometer 100 may include a slit 101 to allow light emitted from a light source to enter the spectrometer 100, a mirror 102 configured to reflect the light that has passed through the slit 101, an optical mask 110, a first driver 120 configured to control the position of the optical mask 110, a detector 130 configured to detect the light that has passed through the optical mask 110, and a dispersive element 140a configured to change the direction of the light incident from the mirror 102 so that the light travels to the optical mask 110 and the detector 130. Although FIG. 1 illustrates that the light source is provided separately from the spectrometer 100, the spectrometer 100 may include the light source in an example embodiment.

The dispersive element 140a may split or separate incident light into multiple color components or various wavelengths. For example, the dispersive element 140a may split the incident light passing through the slit 101 and reflected by the mirror 102. In this case, the incident light may be light in a near-infrared spectral wavelength range of 750 nm to 2000 nm.

The dispersive element 140a may include a diffraction grating, a linear variable filter, a prism, and the like. The diffraction grating may be an element for splitting the spectrum of light according to the wavelengths by using diffraction and interference of light, and may arrange components of the incident light in wavelength order.

For example, as illustrated in FIG. 1, the dispersive element 140a may be a reflective diffraction grating that reflects the incident light while splitting the light. The reflective diffraction grating has a plurality of grooves arranged in parallel at equal intervals, such that a spectrum may be obtained by interference between diffracted light rays in the respective grooves. Accordingly, the reflective diffraction grating may split the incident light at different angles according to wavelengths, and may reflect the split light toward the mirror 102 or the detector 130.

In another example, the dispersive element 140a may be a transmissive diffraction grating that splits incident light collimated by a collimating lens and transmits the light.

In yet another example, the dispersive element 140a may be a prism that splits the incident light collimated by the collimating lens at different angles according to wavelengths and arranges the light. The prism is a transparent material with two or more optical flat surfaces for refracting light, in which at least a pair of surfaces are not parallel to each other. The prism may have a delta shape, but the shape is not limited thereto. When light passes through the prism, the light is dispersed due to different refractive indices for wavelengths, such that a spectrum may be obtained.

The detector 130 may receive the light split by the dispersive element 140a for each wavelength, and may convert the light into an electrical signal.

The detector 130 may include a plurality of pixels. In this case, the plurality of pixels may be arranged in a line array, or may be formed as an area sensor. However, the detector 130 is not limited thereto. The respective pixels of the detector 130 may be formed as any one of a photodiode, a Charge Coupled Device (CCD), a Complementary Metal-Oxide Semiconductor (CMOS), etc., but is not limited thereto.

The optical mask 110 may be disposed on one surface of the detector 130, and the first driver 120 may control the position of the optical mask 110. The optical mask 110 may fully or partially block transmission of light. The optical mask 110 may block transmission of light that have wavelengths outside a passband.

Figure 2A:
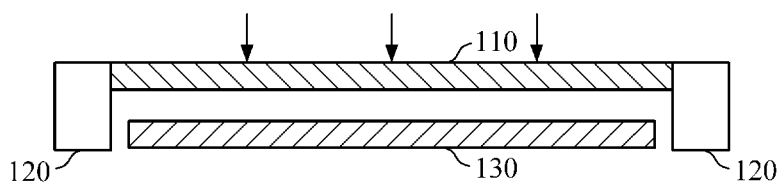
FIG. 2A is a diagram illustrating the arrangement of an optical mask, a detector, and a first driver.

The arrangement of the optical mask 110, the first driver 120, and the detector 130 will be described in detail below with reference to FIG. 2A. FIG. 2A is a diagram illustrating the arrangement of the optical mask, the detector, and the first driver.

Referring to FIG. 2A, the optical mask 110 may be disposed at an upper portion on one surface of the detector 130. In this case, the upper portion of the detector 130 may refer to a light incident surface on which the light that is split by the dispersive element is incident as illustrated in FIG. 2A.

While FIG. 2A illustrates an example in which the respective pixels of the detector 130 are arranged in a line array, the respective pixels may be formed as an area sensor as described above. For convenience of explanation, the following description will be given of an example in which the respective pixels of the detector 130 are arranged in a line array.

While FIG. 2A illustrates an example in which two first drivers 120 are disposed on both sides of the optical mask 110, the first driver 120 is not limited thereto. For example, three or four first drivers 120 may be arranged in a concentric circle around the optical mask 110 and disposed adjacent to the optical mask 110. Alternatively, one first driver 120 may be disposed on one side of the optical mask 110.

Figure 2B:
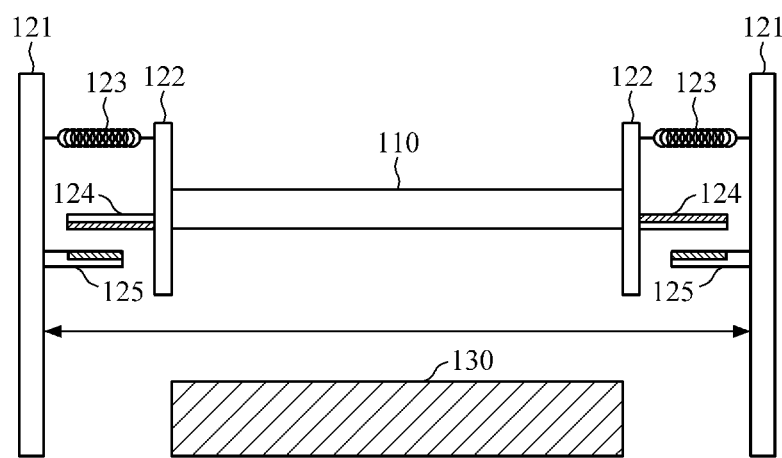
FIG. 2B is a diagram illustrating a first driver according to an example embodiment of the present disclosure.

A detailed configuration of the first driver 120 will be described below with reference to FIG. 2B. FIG. 2B is a diagram illustrating the first driver 120 according to an example embodiment of the present disclosure.

Referring to FIG. 2B, the first driver 120 may include a voice coil 123, a magnet 124, a Hall sensor 125, a support 121, and an optical mask contact portion 122. In this case, as illustrated in FIG. 2B, the voice coil 123, the magnet 124, and the Hall sensor 125 may be disposed between the support 121 and the optical mask contact portion 122.

While FIG. 2B illustrates an example in which the voice coil 123, the magnet 124, and the Hall sensor 125 are respectively disposed on both sides of the optical mask 110, the present disclosure is not limited thereto, and one first driver may be disposed on one side of the optical mask 110, or three or more first drivers may be disposed adjacent to the optical mask 110.

The first driver 120 may control the position of the optical mask based on electromagnetic force generated by, for example, the voice coil 123, the magnet 124, the Hall sensor 125, and the like. For example, the magnet 124 generating a magnetic field may face the voice coil 123, to which a current is supplied. In particular, the first driver 120 may control the position of the optical mask 110 based on the Lorentz force generated perpendicular to both the current and magnetic field.

The first driver 120 may further include a piezoelectric actuator that produces mechanical displacement by an inverse piezoelectric effect when a potential difference is applied.

Referring back to FIG. 1, the optical mask 110 may include a plurality of light transmitting portions and a plurality of non-light transmitting portions which are arranged alternately. The term "non-light transmitting portion" may be also referred to as a light blocking portion.

The light transmitting portions may refer to portions, through which the light split by the dispersive element may pass toward the detector 130, and the non-light transmitting portions may refer to portions through which the light may not pass. In this case, the light transmitting portions may be sealed by a cover made of a transparent material, e.g., glass, plastic, and the like.

A pair of the light transmitting portion and the non-light transmitting portion may be formed to correspond to each pixel of the detector. In this case, the light transmitting portion and the non-light transmitting portion may be formed in a size ratio of predetermined integers. A shape of the optical mask 110 will be described below with reference to FIGS. 3A and 3B.

Figure 3A:
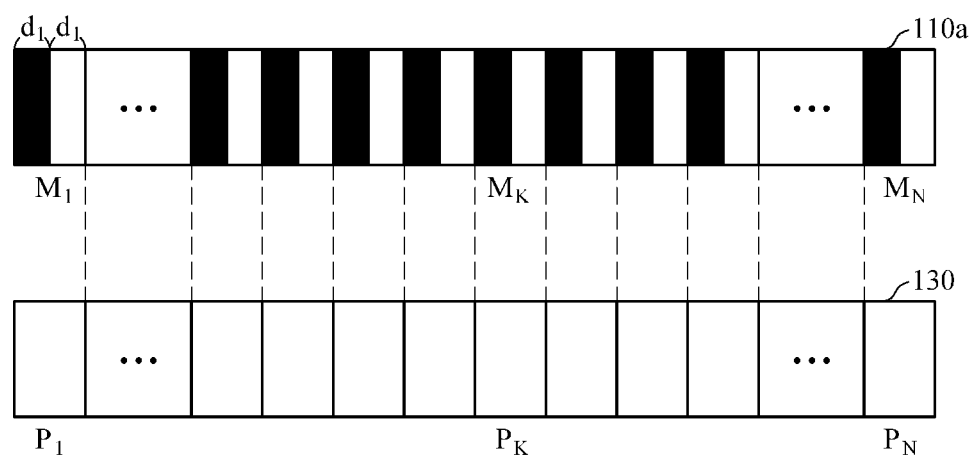
FIG. 3A is a diagram illustrating an optical mask and a detector according to an example embodiment of the present disclosure.

FIG. 3A is a diagram illustrating an optical mask and a detector according to an example embodiment of the present disclosure.

Referring to FIG. 3A, an example is illustrated in which an optical mask 110a has N number of pairs of the light transmitting portions and the non-light transmitting portions, and the detector 130 also includes N number of pixels.

In FIG. 3A, it is illustrated that a first pair $M_1$ of the light transmitting portion and the non-light transmitting portion of the optical mask 110a corresponds to a first pixel $P_1$ of the detector 130; a k-th pair $M_k$ of the light transmitting portion and the non-light transmitting portion of the optical mask 110a corresponds to a k-th pixel $P_k$ of the detector 130; and a last N-th pair $M_N$ of the light transmitting portion and the non-light transmitting portion of the optical mask 110a corresponds to a last N-th pixel $P_N$ of the detector 130.

In FIG. 3A, the respective light transmitting portions and non-light transmitting portions have the same width of $d_1$. That is, the respective light transmitting portions and non-light transmitting portions are formed in a size ratio of 1 to 1.

Figure 3B:
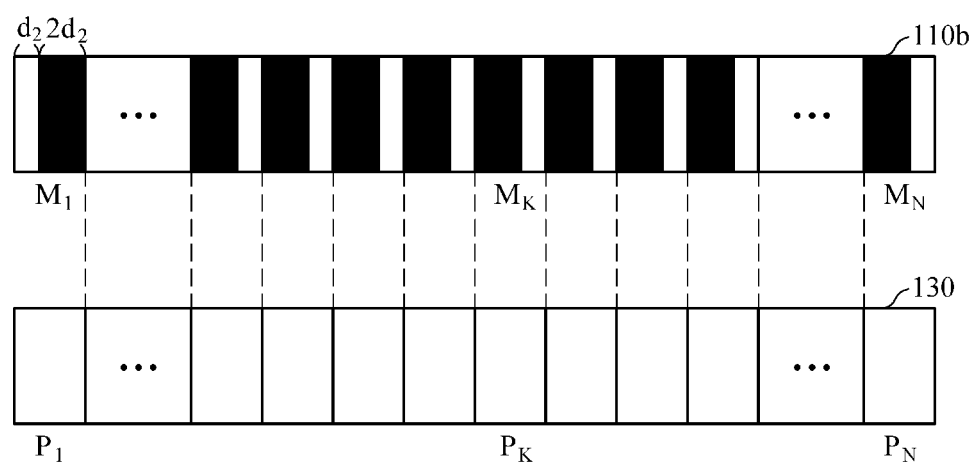
FIG. 3B is a diagram illustrating an optical mask and a detector according to another example embodiment of the present disclosure.

FIG. 3B is a diagram illustrating an optical mask and a detector according to another example embodiment of the present disclosure.

Referring to FIG. 3B, an optical mask 110b has N number of pairs of the light transmitting portions and the non-light transmitting portions, and the detector 130 includes N number of pixels.

FIG. 3B illustrates that a first pair $M_1$ of the light transmitting portion and the non-light transmitting portion of the optical mask 10a corresponds to a first pixel $P_1$ of the detector 130; and a last N-th pair $M_N$ of the light transmitting portion and the non-light transmitting portion of the optical mask 10a corresponds to a last N-th pixel $P_N$ of the detector 130.

In FIG. 3B, the respective light transmitting portions have a width of $d_2$, and the non-light transmitting portions have a width of $2d_2$. That is, the respective light transmitting portions and the non-light transmitting portions are formed in a size ratio of 1 to 2. However, the size ratio of the light transmitting portions and the non-light transmitting portions is not limited thereto, and may be changed variously.

While FIGS. 3A and 3B illustrate that the light transmitting portions and the non-light transmitting portions are alternately arranged with respect to a vertical length surface of the optical masks 110a and 110b, the light transmitting portions and the non-light transmitting portions are not limited thereto and may be alternately arranged with respect to a horizontal length surface of the optical masks 10a and 10b.

While FIGS. 3A and 3B illustrate that the number of pairs of the light transmitting portions and the non-light transmitting portions is equal to the number of pixels of the detector 130, but the numbers are not limited thereto, and any one number may be greater or less than the other number.

Referring back to FIG. 1, the first driver 120 may control the position of the optical mask 110 to change an effective pixel area of each pixel for receiving light incident on the light transmitting portions of the optical mask 110. A process of changing the effective pixel area by the first driver 120 will be described below with reference to FIG. 4.

Figure 4:
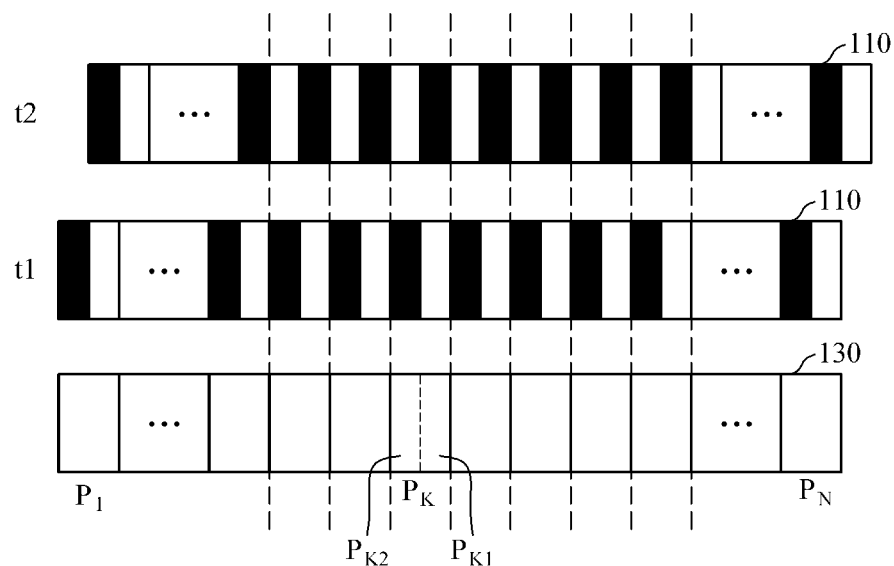
FIG. 4 is a diagram explaining a process of sequentially controlling a position of an optical mask by a first driver.

FIG. 4 is a diagram explaining a process of sequentially controlling a position of the optical mask by the first driver.

FIG. 4 illustrates a position of the optical mask 110 controlled by the first driver at time t1 and a position of the optical mask 110 controlled by the first driver at time t2. As illustrated in FIG. 3A, FIG. 4 illustrates the case where the light transmitting portions and the non-light transmitting portions of the optical mask 110 are formed in a size ratio of 1 to 1.

By using the K-th pixel $P_K$ of the detector 130 in FIG. 4 as an example, $P_{K1}$ corresponds to the light transmitting portion at the position of the optical mask 110 controlled by the first driver at the time t1, such that $P_{K1}$ is the effective pixel area; and $P_{K2}$ corresponds to the light transmitting portion at the position of the optical mask 110 controlled by the first driver at the time t2, such that $P_{K2}$ is the effective pixel area. The term "effective pixel area" may be also referred to as a light incident area of a pixel.

That is, in the case where the light transmitting portions and the non-light transmitting portions of the optical mask 110 are formed in a size ratio of 1 to 1 as illustrated in FIG. 4, the first driver may control twice the position of the optical mask 110 to an initial position and a changed position. In this case, unlike FIG. 4, if the light transmitting portions and the non-light transmitting portions of the optical mask 110 are formed in a size ratio of, for example, 1 to 2 as illustrated in FIG. 3B rather than in a size ratio of 1 to 1, the first driver may control the position of the optical mask 110 three times.

As described above, only the effective pixel area of each pixel receives light, rather than the entire area of each pixel of the detector 130, such that the wavelength resolution may be improved even without increasing the physical number of pixels. That is, only a portion of a dispersed wavelength band is transmitted to the effective pixel area of each pixel, such that a wavelength band transmitted to the effective pixel area of each pixel decreases in width, thus improving resolution of the spectrometer. In this case, as a difference in the size ratio between the light transmitting portions and the non-light transmitting portions increases (e.g., 1:3, 1:4, 1:5, etc.), the width of the wavelength band transmitted to the effective pixel area of each pixel may further decrease, thereby further improving the resolution of the spectrometer.

Figure 5:
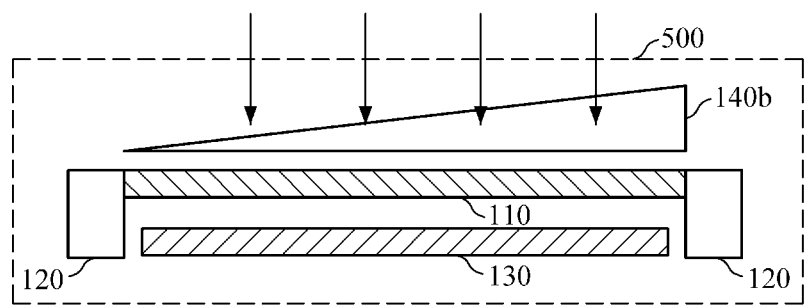
FIG. 5 is a diagram illustrating a spectrometer including a linear variable filter.

FIG. 5 is a diagram illustrating a spectrometer including a linear variable filter. The optical mask 110, the first driver 120, and the detector 130 are described in detail above with reference to FIGS. 1 to 3, such that a description thereof will be omitted below.

Referring to FIG. 5, a spectrometer 500 may include a linear variable filter 140b as a dispersive element, instead of the diffraction grating 140a of FIG. 1.

The linear variable filter 140b may refer to a filter having a thickness which changes in a length direction. The linear variable filter 140b may be an optical filter having the Fabry-Perot resonator structure in which the thickness of a dielectric resonance layer varies linearly in the length direction. In the linear variable filter 140b, a lower mirror layer and an upper mirror layer are disposed with a dielectric resonance layer interposed therebetween.

Depending on an incident position of light, the light is dispersed due to different transmission wavelength bands, such that a spectrum may be obtained.

Figure 6:
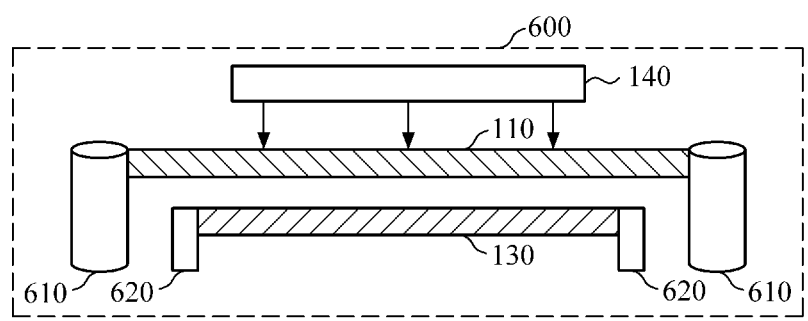
FIG. 6 is a diagram illustrating a spectrometer according to another example embodiment of the present disclosure.

FIG. 6 is a diagram illustrating a spectrometer according to another example embodiment of the present disclosure. Referring to FIG. 6, a spectrometer 600 may include the optical mask 110, an optical mask support 610, the detector 130, and a second driver 620.

As illustrated above with reference to FIGS. 1 to 5, the optical mask 110 may be disposed on one surface of the detector 130 and may include a plurality of light transmitting portions and non-light transmitting portions which are arranged alternately; and the detector 130 includes a plurality of pixels for receiving split light. In FIG. 6, light incident on the optical mask 110 may refer to light split by the dispersive element 140, such as the diffraction grating, the linear variable filter, and the like.

The optical mask 110 may be disposed at an upper portion of the detector 130 and the second driver 620.

The optical mask support 610 may be disposed on one side of the optical mask 110 to fix the position of the optical mask 110. While FIG. 6 illustrates an example in which the optical mask support 610 is disposed on each of both sides of the optical mask 110, the number and position of the optical mask support 610 are not limited thereto.

The second driver 620 may be disposed on one side of the detector 130. While FIG. 6 illustrates an example in which two second drivers 620 are disposed on both sides of the detector 130, the second driver 620 is not limited thereto. For example, three or four second drivers 620 may be arranged in a concentric circle around the detector 130 and disposed adjacent to the detector 130. Alternatively, one second driver 620 may be disposed on one side of the detector 130.

Like the first driver described above with reference to FIG. 2B, the second driver 620 may control the position of the detector 130 by using a voice coil, a magnet, a Hall sensor, and the like. However, the second driver 620 is not limited thereto.

By controlling the position of the detector 130, the second river 620 may change an effective pixel area of each pixel for receiving light incident on the light transmitting portions of the optical mask 110. That is, in the same manner as the first driver that controls the position of the optical mask 110 in FIG. 4, the second driver 620 may sequentially control the position of the detector 130 in a size ratio of the light transmitting portions and non-light transmitting portions, so as to sequentially change the effective pixel area of each pixel of the detector 130.

Figure 7A:
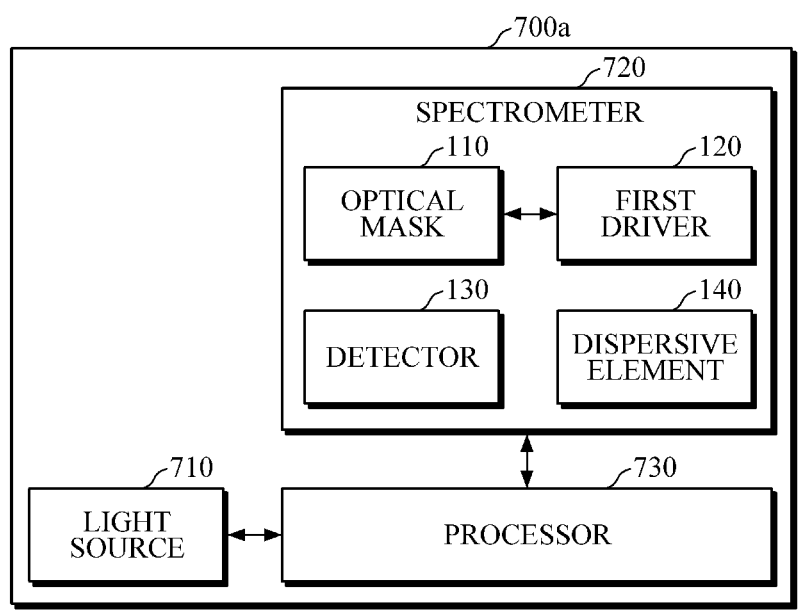
FIG. 7A is a block diagram illustrating an apparatus for estimating bio-information according to an example embodiment of the present disclosure.

FIG. 7A is a block diagram illustrating an apparatus for estimating bio-information according to an example embodiment of the present disclosure. Referring to FIG. 7A, an apparatus 700a for estimating bio-information may include a light source 710, a spectrometer 720, and a processor 730. The bio-information may include blood glucose, triglyceride, cholesterol, calories, protein, uric acid, etc., but is not limited thereto.

The light source 710 may include a light emitting diode (LED), a laser diode (LD), a phosphor, etc., but is not limited thereto. In this case, the light emitted by the light source 710 may be light in a near-infrared spectral wavelength range of 750 nm to 2000 nm, but is not limited thereto and may be changed variously including the Raman spectral wavelength range, the mid-infrared spectral wavelength range, and the like.

The light source 710 may emit light onto an object OBJ according to a control signal of the processor 730, and the light emitted by the light source 710 may be directed to a required position of the object OBJ by at least one optical element.

The spectrometer 720 may split and receive light scattered or reflected from the object after the light is emitted by the light source 710, and may include the optical mask 110, the first driver 120, the detector 130, and the dispersive element 140. The spectrometer 720 may further include the second driver 620 illustrated in FIG. 6. In this case, the spectrometer 720 may refer to any one of the spectrometers 100 and 50) of FIGS. 1 and 5. However, unlike FIG. 7A, the spectrometer 720 may refer to the spectrometer 600 of FIG. 6.

The processor 730 may be electrically connected to the light source 710 and the spectrometer 720.

The processor 730 may estimate bio-information based on a light receiving result of the spectrometer 720. For example, when the detector 130 receives the light, split by the dispersive element 140 for each wavelength, and converts the light into an electrical signal, the processor 730 receives the light and estimates bio-information of a user.

The processor 730 may synthesize the respective spectrum data obtained by changing the effective pixel area, and may generate final spectrum data. Referring to FIG. 4, the processor 730 may obtain first spectrum data based on a quantity of light detected in a first effective pixel area (e.g., $P_{K1}$) of each pixel at time t1 and second spectrum data based on a quantity of light detected in a second effective pixel area (e.g., $P_{K2}$) of each pixel at time t2, and may generate final spectrum data by synthesizing the obtained first spectrum data and second spectrum data.

The processor 730 may estimate a user's bio-information by using the generated final spectrum data, a predetermined bio-information estimation model, and the like.

Figure 7B:
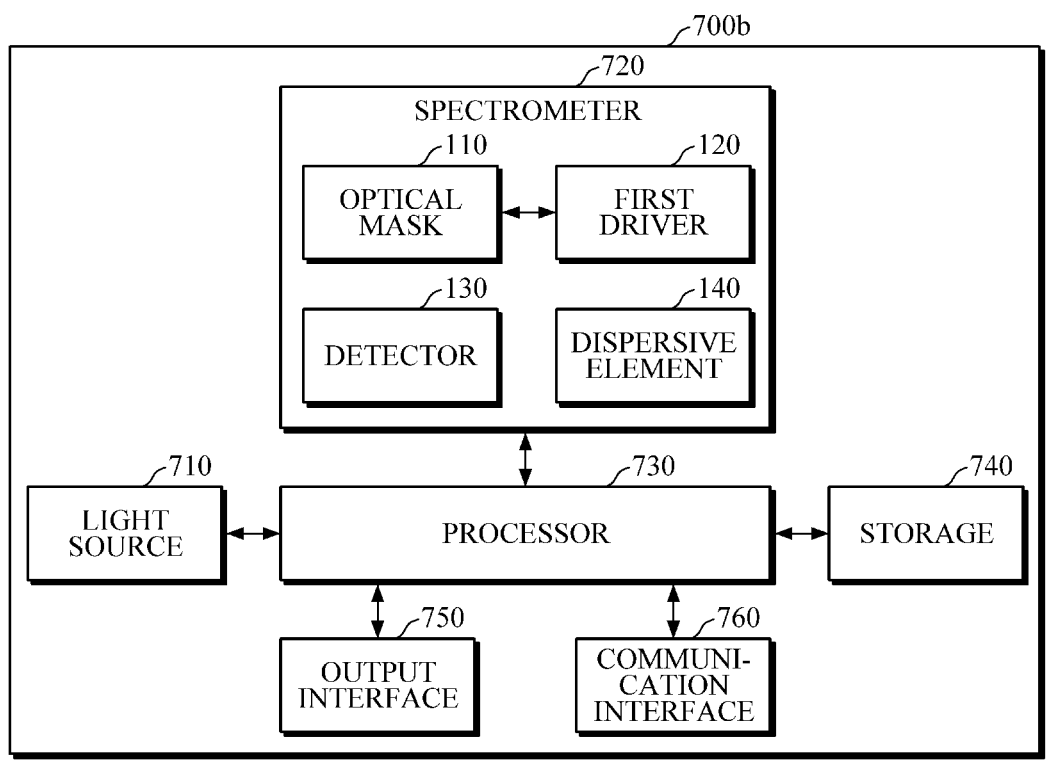
FIG. 7B is a block diagram illustrating an apparatus for estimating bio-information according to another example embodiment of the present disclosure.

FIG. 7B is a block diagram illustrating an apparatus for estimating bio-information according to another example embodiment of the present disclosure. An apparatus 700*b* for estimating bio-information may further include a storage 740, an output interface 750, and a communication interface 760, in addition to the components of the apparatus 700*a* for estimating bio-information described above with reference to FIG. 7A. In order to avoid redundancy, the following description will be focused on the storage 740, the output interface 750, and the communication interface 760.

The storage 740 may store processing results of the processor 730. Further, the storage 740 may store a variety of reference information required for estimating bio-information. For example, the reference information may include user characteristic information, such as a user's age, gender, health condition, and the like. In addition, the reference information may include a bio-information estimation model, bio-information estimation criteria, calibration intervals, and the like, but is not limited thereto.

In particular, the storage 740 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The output interface 750 may output a variety of information under the control of the processor 730. In particular, the output interface 750 may display bio-information estimated by the processor 730 or health condition information related thereto, warning or alarm information, etc., and may display the information by using various visual display methods for a user.

The output interface 750 may include a touch module for receiving touch input. The output interface 750 may output a user interface, through which the output interface 750 may receive a command input from a user, and may transmit the received command to the processor 730. The apparatus 700*b* for estimating bio-information may receive a separate manipulator for receiving a user's control command and transmitting the received control command to the processor 730. The manipulator may have a power button for inputting a command to turn on/off the apparatus 700*b* for estimating bio-information, and the like.

The communication interface 760 may access a communication network according to a control signal of the processor 730 by using communication techniques, and may be connected to an external device, connected to the same communication network, to transmit and receive required data. The processor 730 may control the communication interface 760 to be connected to the external device, and may process various operations in conjunction with the connected external device. In this case, the processor 730 may provide required information to the external device according to a degree of a bio-information estimation function of the connected external device.

Examples of the communication techniques may include Bluetooth communication, Bluetooth Low Energy (BLE) communication, Near Field Communication (NFC), WLAN communication, Zigbee communication, Infrared Data Association (IrDA) communication, Wi-Fi Direct (WFD) communication. Ultra-Wideband (UWB) communication, Ant+ communication, WIFI communication, Radio Frequency Identification (RFID) communication, 3G, 4G, and 5G communications, and the like. However, this is merely exemplary and is not intended to be limiting.

For example, the communication interface 760 may communicate with the external device to transmit information, such as the generated final spectrum data and the like, to the external device. In addition, the communication interface 760 may receive reference information, e.g., reference blood glucose value and the like, for calibration of the apparatus for estimating bio-information from the external device, and may transmit the received information to the processor 730.

FIG. 8 is a flowchart illustrating a method of estimating bio-information according to an example embodiment of the present disclosure. The method of FIG. 8 is an example of a method of estimating bio-information performed by the spectrometers 100 and 500 of FIGS. 1 and 5, which are described in detail above, and thus will be briefly described below in order to avoid redundancy.

First, the apparatus for estimating bio-information may control the position of the optical mask in operation 810. In particular, the apparatus for estimating bio-information may control the position of the optical mask to an initial position by using the first driver.

Then, the apparatus for estimating bio-information may emit light in operation 820.

Subsequently, an effective pixel portion of each pixel may receive split light in operation 830. The effective pixel portion of a pixel may receive light that is split by a dispersive element and that passes through an light transmitting portion of an optical mask. The dispersive element may include a diffraction grating, a linear variable filter, a prism, and the like. The light may not reach the remaining portion of the pixel other than the effective pixel portion due to a non-light transmitting portion of the optical mask.

Next, the apparatus for estimating bio-information may change the effective pixel portion of each pixel by controlling the position of the optical mask in operation 840. In this case, the first driver may control the position of the optical mask by using a voice coil, a magnet, a Hall sensor, and the like.

Then, the changed effective pixel portion of each pixel may receive the split light in operation 850.

Subsequently, the apparatus for estimating bio-information may determine whether it is required to further control the position of the optical mask in operation 860. In this case, based on a size ratio between the light transmitting portions and non-light transmitting portions of the optical mask, the apparatus for estimating bio-information may determine whether it is required to further control the position of the optical mask. For example, in the case where the light transmitting portions and non-light transmitting portions of the optical mask are formed in a size ratio of 1 to 1, the apparatus for estimating bio-information may determine in operation 860 that it is not required to further control the position of the optical mask; and in the case where the light transmitting portions and non-light transmitting portions of the optical mask are formed in a size ratio of 1 to 2, the apparatus for estimating bio-information may determine in operation 860 that it is required to further control the position of the optical mask. However, the present disclosure is not limited thereto.

Upon determination that it is not required to further control the position of the optical mask, the apparatus for estimating bio-information may generate final spectrum data by synthesizing the respective spectrum data obtained at each position of the optical mask in operation 870.

Next, the apparatus for estimating bio-information may estimate bio-information of a user based on the generated spectrum data in operation 880.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM). CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A spectrometer comprising:
   a detector comprising a plurality of pixels configured to receive light;
   an optical mask disposed in an optical path of the light that travels to the detector and comprising a plurality of light transmitting portions and a plurality of light blocking portions which are arranged alternately; and
   a driver disposed on two opposing sides of the optical mask to change a position of the optical mask or disposed on two opposing sides of the detector to change a position of the detector, and configured to change a light incident area of each of the plurality of pixels to receive the light incident on the plurality of light transmitting portions of the optical mask,
   wherein the driver comprises at least one of an actuator, a coil, a magnet, and a Hall sensor,
   wherein the plurality of light transmitting portions and the plurality of light blocking portions comprises a plurality of pairs of a light transmitting portion and a light blocking portion, and
   wherein each of the plurality of pairs of the light transmitting portion and the light blocking portion is arranged to correspond to each of the plurality of pixels of the detector in a one-to-one correspondence.

2. The spectrometer of claim 1, further comprising a dispersive element configured to split the light before the light reaches the detector,
   wherein the dispersive element is a diffraction grating or a linear variable filter.

3. The spectrometer of claim 1, further comprising a dispersive element configured to split the light before the light reaches the detector,
   wherein the dispersive element is a diffraction grating or a linear variable filter,
   wherein the driver is configured to control the position of the optical mask, and
   wherein the optical mask is disposed between the dispersive element and the detector along the optical path of the light.

4. The spectrometer of claim 1, wherein a ratio between a width of the light transmitting portion and a width of the light blocking portion is a predetermined integer.

5. The spectrometer of claim 4, wherein the driver sequentially changes the position of the optical mask based on the ratio between the width of the light transmitting portion and the width of the light blocking portion, to sequentially change the light incident area of each of the plurality of pixels of the detector.

6. The spectrometer of claim 1, wherein the plurality of pixels of the detector are arranged in a line array, or are formed as an area sensor.

7. The spectrometer of claim 1, further comprising a dispersive element configured to split the light before the light reaches the detector,
   wherein the dispersive element is a diffraction grating or a linear variable filter,
   wherein the driver is configured to control the position of the detector, and wherein the optical mask is disposed between the dispersive element, and the detector, and between two supporting structures of the driver.

8. The spectrometer of claim 7, wherein a ratio between a width of the light transmitting portion and a width of the light blocking portion is a predetermined integer.

9. The spectrometer of claim 8, wherein the driver sequentially changes the position of the detector based on the ratio between the width of the light transmitting portion and the width of the light blocking portion, to sequentially change the light incident area of each of the plurality of pixels of the detector.

10. An apparatus for estimating bio-information, the apparatus comprising:
- a light source configured to emit light;
- a detector comprising a plurality of pixels configured to receive the light;
- an optical mask disposed in an optical path of the light that travels to the detector, and comprising a plurality of light transmitting portions and a plurality of light blocking portions which are arranged alternately;
- a driver disposed on two opposing sides of the optical mask configured to control a position of the optical mask or disposed on two opposing sides of the detector to change a position of the detector, and configured to change a light incident area of each of the plurality of pixels to receive the light incident on the plurality of light transmitting portions of the optical mask; and
- a processor configured to estimate bio-information of a user based on a light receiving result of the detector, wherein the driver comprises at least one of an actuator, a coil, a magnet, and a Hall sensor, wherein the plurality of light transmitting portions and the plurality of light blocking portions comprises a plurality of pairs of a light transmitting portion and a light blocking portion, and wherein each of the plurality of pairs of the light transmitting portion and the light blocking portion is arranged to correspond to each of the plurality of pixels of the detector in a one-to-one correspondence.

11. The apparatus of claim 10, wherein the processor is further configured to generate spectrum data based on the light incident on the light incident area of each of the plurality of pixels by controlling the position the optical mask.

12. The apparatus of claim 10, wherein a ratio between a width of the light transmitting portion and a width of the light blocking portion is a predetermined integer.

13. The apparatus of claim 12, wherein the driver is configured to sequentially change the position of the optical mask based on the ratio between the width of the light transmitting portion and the width of the light blocking portion, to sequentially change the light incident area of each of the plurality of pixels of the detector.

14. An electronic device comprising:
- a light source configured to emit light;
- a light detector comprising at least one pixel configured to detect the light emitted from the light source;
- an optical mask that is provided between the light source and the light detector along an optical path of the light, and that comprises a light transmitting portion and a light blocking portion; and
- a driver disposed on two opposing sides of the optical mask to adjust a position of the optical mask relative to the light detector, so that a portion of the at least one pixel is aligned with the light transmitting portion of the optical mask, and another portion of the at least one pixel is aligned with the light blocking portion of the optical mask, wherein the driver comprises at least one of an actuator, a coil, a magnet, and a Hall sensor, wherein the plurality of light transmitting portions and the plurality of light blocking portions comprises a plurality of pairs of a light transmitting portion and a light blocking portion, and wherein each of the plurality of pairs of the light transmitting portion and the light blocking portion is arranged to correspond to each of a plurality of pixels of the detector in a one-to-one correspondence.

* * * * *